United States Patent
Albarqouni et al.

(10) Patent No.: US 11,662,320 B2
(45) Date of Patent: May 30, 2023

(54) ASCERTAINING THE POSE OF AN X-RAY UNIT RELATIVE TO AN OBJECT ON THE BASIS OF A DIGITAL MODEL OF THE OBJECT

(71) Applicant: Siemens Aktiengesellschaft, Munich (DE)

(72) Inventors: Shadi Albarqouni, Munich (DE); Linda Mai Bui, Grasslfing (DE); Michael Schrapp, Munich (DE); Slobodan Ilic, Munich (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 791 days.

(21) Appl. No.: 16/497,092

(22) PCT Filed: Mar. 20, 2018

(86) PCT No.: PCT/EP2018/056949
§ 371 (c)(1),
(2) Date: Sep. 24, 2019

(87) PCT Pub. No.: WO2018/177798
PCT Pub. Date: Oct. 4, 2018

(65) Prior Publication Data
US 2020/0378904 A1    Dec. 3, 2020

(30) Foreign Application Priority Data
Mar. 27, 2017    (DE) ............ 10 2017 205 113.2

(51) Int. Cl.
*G01N 23/046*    (2018.01)
*G01B 15/02*    (2006.01)
(Continued)

(52) U.S. Cl.
CPC ......... *G01N 23/046* (2013.01); *G01B 15/025* (2013.01); *G01N 23/083* (2013.01);
(Continued)

(58) Field of Classification Search
CPC ............. G01N 23/046; G01N 23/083; G01N 2223/401; G01N 2223/419; G01B 15/025; G06N 3/04; G06N 3/08
See application file for complete search history.

(56) References Cited

U.S. PATENT DOCUMENTS

| 5,907,594 A | 5/1999 | Lai et al. .......................... 378/4 |
| 6,911,988 B1 | 6/2005 | Tsujii et al. ................... 345/581 |

(Continued)

FOREIGN PATENT DOCUMENTS

| DE | 10 2006 011 008 A1 | 2/2007 | ............. G01N 23/06 |
| JP | 2001157199 A | 6/2001 | ............... A61B 6/00 |

(Continued)

OTHER PUBLICATIONS

JP 2001157199 A, U.S. Pat. No. 6,911,988 B1.
(Continued)

*Primary Examiner* — David P Porta
*Assistant Examiner* — Mamadou Faye
(74) *Attorney, Agent, or Firm* — Slayden Grubert Beard PLLC

(57) ABSTRACT

Various embodiments include a method for facilitating tomographic reconstruction comprising: emitting an x-ray beam from an x-ray unit; ascertaining an attenuation of the x-ray beam during transmission through an object situated in a beam path of the x-ray beam; ascertaining structure data of the object based at least in part on the attenuation of the x-ray beam; and ascertaining a pose of the x-ray unit relative to the object using a digital model of the object and based at least in part on the attenuation of the x-ray beam.

10 Claims, 1 Drawing Sheet

(51) Int. Cl.
*G01N 23/083* (2018.01)
*G06N 3/04* (2023.01)
*G06N 3/08* (2023.01)

(52) U.S. Cl.
CPC ............... *G06N 3/04* (2013.01); *G06N 3/08* (2013.01); *G01N 2223/04* (2013.01); *G01N 2223/401* (2013.01); *G01N 2223/419* (2013.01)

(56) References Cited

U.S. PATENT DOCUMENTS

| | | | | |
|---|---|---|---|---|
| 2004/0105526 | A1* | 6/2004 | Zhang | A61B 6/4452 378/205 |
| 2005/0058242 | A1* | 3/2005 | Peschmann | G01R 27/06 378/57 |
| 2007/0280407 | A1* | 12/2007 | Kunze | A61B 6/466 378/4 |
| 2008/0212734 | A1 | 9/2008 | Kasperl | 378/4 |
| 2010/0239153 | A1 | 9/2010 | Kuduvalli | 382/132 |
| 2013/0177230 | A1 | 7/2013 | Feng | 382/132 |
| 2014/0119500 | A1* | 5/2014 | Akahori | A61B 6/585 378/17 |
| 2017/0024634 | A1* | 1/2017 | Miao | G06K 9/6277 |
| 2018/0156742 | A1* | 6/2018 | Cao | G21K 7/00 |

FOREIGN PATENT DOCUMENTS

| | | | | |
|---|---|---|---|---|
| JP | 2001509400 A | 7/2001 | ............... | A61B 6/03 |
| JP | 2004362128 A | 12/2004 | ............. | G01B 11/27 |
| JP | 2010004959 A | 1/2010 | ............... | A61B 6/03 |
| JP | 2010204060 A | 9/2010 | ............. | G01N 23/04 |
| JP | 2013174495 A | 9/2013 | ............. | G01N 23/04 |

OTHER PUBLICATIONS

JP 2001509400 A, U.S. Pat. No. 5,907,594 A.
Tekaya, Ismail Ben et al., "Registration-Based Geometric Calibration of Industrial X-Ray Tomgraphy System," IEEE Transactions on Nuclear Science, vol. 60, No. 5, pp. 3937-3944, Oct. 9, 2013.
Japanese Office Action, Application No. 2019551344, 7 pages, dated Dec. 22, 2020.
Search Report for International Application No. PCT/EP2018/056949, 11 pages, dated Aug. 6, 2018.
Miao Shun et al: "A CNN regression approach for real-time 2D/3D registration." IEEE transactions on medical imaging vol. 35, No. 5; pp. 1352-1363, May 2016.
Dennis D. A. et al: "A robust method for registration of three-dimensional knee implant models to two-dimensional fluoroscopy images", IEEE Transactions on Medical Imaging, IEEE Service Center, Piscataway, NJ, US, vol. 22, No. 12, pp. 1561-1574, XP011103806, ISSN: 0278-0062, DOI: 10.1109/TMI.2003.820027, Dec. 2003.
Khotanzad, Alireza et al., "Recognition and Pose Estimation of Unoccluded Three-Dimensional Objects from a Two-Dimensional Perspective View by Banks of Neural Networks," IEEE Transactions on Neural Networks, vol. 7, No. 4, pp. 897-906, Jul. 1, 1996.
Miao, Shun et al., "Real-Time 2D/3D Registration via CNN Regression," IEEE 13th International Symposium on Biomedical Imaging (ISBI), pp. 1430-1434, Apr. 1, 2016.
European Office Action, Application No. 18716525.3, 6 pages, dated Feb. 14, 2022.

\* cited by examiner

ASCERTAINING THE POSE OF AN X-RAY UNIT RELATIVE TO AN OBJECT ON THE BASIS OF A DIGITAL MODEL OF THE OBJECT

CROSS-REFERENCE TO RELATED APPLICATIONS

This application is a U.S. National Stage Application of International Application No. PCT/EP2018/056949 filed Mar. 20, 2018, which designates the United States of America, and claims priority to DE Application No. 10 2017 205 113.2 filed Mar. 27, 2017, the contents of which are hereby incorporated by reference in their entirety.

TECHNICAL FIELD

The present disclosure relates to x-ray machines. Various embodiments may include methods for facilitating tomographic reconstruction of an object by means of an x-ray apparatus and/or x-ray apparatus.

BACKGROUND

X-ray apparatuses are used for diagnostics and testing as they can provide information about the inner structure of an object. X-ray images represent an attenuation of an x-ray beam caused by passing through an object. Typically, an x-ray beam is emitted by an x-ray source and detected by an x-ray detector. The attenuation is measured along the x-ray beam and depends both on the object and on the configuration of the x-ray apparatus. The configuration of the x-ray apparatus may relate to the precise distance between the x-ray source and the x-ray detector and the precise distance of the object from the x-ray source and from the x-ray detector. An accurate 3-D reconstruction can be achieved via tomographic reconstruction methods; a large number of x-ray images from different positions and angles and a precise configuration of the x-ray apparatus may be required to this end.

The precise configuration of the x-ray apparatus is achieved by the geometric reconstruction and geometric calibration of the x-ray apparatus. Mobile x-ray systems are frequently used in industrial applications. In this case, both the positions of the x-ray source and of the x-ray detector and the object to be inspected are as desired. Therefore, no precise configuration of the x-ray apparatus is provided in this case.

By way of example, C-arms for medical applications are known from the prior art. Here, inaccuracies in the configuration of the x-ray apparatus may lead to poor image quality of tomographically reconstructed images. The use of a calibration body for calibration purposes and the use of self-calibrating methods are known solutions to this problem. The calibration body is configured in such a way that its x-ray image is unambiguously identifiable, and position and orientation of the x-ray source and of the x-ray detector are unambiguously ascertainable therefrom. Methods for self-calibration envisage an analysis of the x-ray images. By way of example, the tomographically reconstructed image is estimated and geometric parameters are iteratively optimized in order to obtain an optimal reconstructed image.

SUMMARY

The teachings of the present disclosure may facilitate improved tomographic reconstruction of an object. For example, some embodiments include a method for facilitating tomographic reconstruction, including the steps of: emitting an x-ray beam (5) by an x-ray unit (1), ascertaining an attenuation of the x-ray beam (5) during transmission through the object (4) situated in a beam path of the x-ray beam (5) of the x-ray unit (1), ascertaining structure data of the object (4) on the basis of the attenuation of the x-ray beam (5), characterized in that a pose of the x-ray unit (1) is ascertained relative to the object (4) on the basis of a digital model of the object (4) and on the basis of the attenuation of the x-ray beam (5), for the purposes of facilitating the tomographic reconstruction.

In some embodiments, the x-ray unit (1) comprises an x-ray source (2) and an x-ray detector (3), wherein a relative position between x-ray source (2), object (4) and x-ray detector (3) is freely chosen provided the condition that the object (4) is situated in the beam path of the x-ray beam (5) is observed.

In some embodiments, model values (11) for the attenuation of the x-ray beam (5) during transmission through the object (4) are calculated on the basis of the digital model of the object (4) for a plurality of poses of the x-ray unit (5) relative to the object (4).

In some embodiments, a device (7) for machine learning, more particularly an artificial neural network, is trained to ascertain the pose of the x-ray unit (4) relative to the object (4) on the basis of the ascertained attenuation of the x-ray beam (5) using the model values (11).

In some embodiments, the pose of the x-ray unit (1) relative to the object (4) is ascertained at least in part by comparing the ascertained attenuation of the x-ray beam (5) to the model values (11).

In some embodiments, the device (7) for machine learning, more particularly the artificial neural network, is further trained by backpropagation (20).

In some embodiments, projection values for the attenuation of the x-ray beam (5) are calculated for the ascertained pose of the x-ray unit (1) relative to the object (4) and said projection values are compared to the ascertained attenuation of the x-ray beam (5).

In some embodiments, the calculation of the projection values and/or ascertainment of the pose of the x-ray unit (1) relative to the object (4) by backpropagation (21) is further trained on the basis of the comparison of the projection values with the ascertained attenuation.

As another example, some embodiments include an x-ray apparatus (9), comprising: an x-ray source (2) for emitting an x-ray beam (5), an x-ray detector (3) for ascertaining an attenuation of the x-ray beam (5) through an object (4) situated in the beam path of the x-ray beam (5), and comprising a computing unit (6) configured to ascertain structure data of the object (4) on the basis of the attenuation of the x-ray beam (5), characterized by a memory unit (8), in which a digital model of the object (4) is storable, wherein the computing unit (6) is configured to ascertain a pose of the x-ray unit (1) relative to the object (4) on the basis of the detected attenuation of the x-ray beam (5) and the digital model.

In some embodiments, the computing unit (6) comprises a device (7) for machine learning, more particularly an artificial neural network.

BRIEF DESCRIPTION OF THE DRAWINGS

Further features and advantages of the methods and systems described herein can be gathered from the following description on the basis of the appended figures. In the FIG. 1 shows a block diagram of an x-ray apparatus comprising an x-ray source and an x-ray detector.

DETAILED DESCRIPTION

Figure 1:
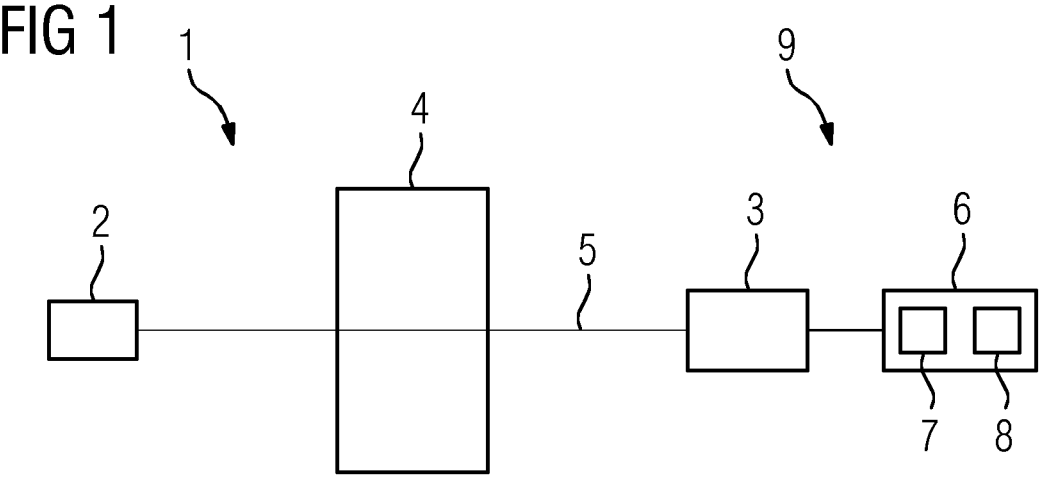

Initially, an x-ray beam is emitted by an x-ray unit in a generic method for facilitating tomographic reconstruction of an object. The x-ray unit comprises, in particular, an x-ray detector and an x-ray source, the latter emitting the x-ray beam. In another step, an attenuation of the x-ray beam during transmission through the object situated in a beam path of the x-ray beam of the x-ray unit is ascertained. The attenuation of the x-ray beam is ascertained by the x-ray detector.

In some embodiments, the x-ray detector records a two-dimensional x-ray image, wherein parts of the x-ray image, more particularly picture elements or pixels, are illuminated at an intensity that depends on the attenuation of the x-ray beam. Consequently, the attenuation of the x-ray beam can be ascertained in the form of the x-ray image. In some embodiments, the attenuation can be ascertained by capturing a residual intensity of the x-ray beam after the transmission through the object. The x-ray image may correspond to a two-dimensional projection of the residual intensity of the x-ray beam in an image plane of the x-ray image after transmission through the object, more particularly through the three-dimensional object.

Structure data of the object are ascertained on the basis of the attenuation of the x-ray beam. In some embodiments, the material thickness, the material type and/or an absorption coefficient for the object can be ascertained on the basis of the attenuation.

In some embodiments, a pose of the x-ray unit may be ascertained relative to the object on the basis of a digital model of the object and on the basis of the attenuation of the x-ray beam, for the purposes of facilitating the tomographic reconstruction. In particular, the attenuation of the x-ray beam is related to the digital model in order to ascertain the pose of the x-ray unit relative to the object. In this disclosure, "pose" means a combination of relative position and alignment.

In some embodiments, the pose of the object is ascertained relative to the x-ray detector and/or to the x-ray source. As an alternative or in addition thereto, the pose of the object can be ascertained relative to the x-ray unit. Improved tomographic reconstruction of the object is facilitated as a result of the pose of the x-ray unit being ascertained by means of the present methods.

The pose of the x-ray unit relative to the object is tantamount to the pose of the object relative to the x-ray unit. Consequently, within the scope of the present disclosure, the pose of the object relative to the x-ray detector should always be understood to also conversely mean the pose of the x-ray detector or of part of the x-ray detector, more particularly the x-ray source or the x-ray detector, relative to the object.

In some embodiments, the x-ray unit comprises an x-ray source and an x-ray detector, wherein a relative position between x-ray source, object, and x-ray detector is freely chosen provided the condition that the object is situated in the beam path of the x-ray beam is observed. Expressed differently, there is no set relative position in which the x-ray detector and the x-ray source or x-ray detector, x-ray source and object must be situated. In particular, the position of the x-ray source can be chosen independently of the position of the x-ray detector and/or the position of the object.

In some embodiments, model values for the attenuation of the x-ray beam during transmission through the object may be calculated on the basis of the digital model of the object for a plurality of poses of the x-ray unit relative to the object. In some embodiments, model values for the attenuation of the x-ray beam are calculated on the basis of a physical model and/or within the scope of a simulation. In some embodiments, the model values are calculated for a multiplicity of poses of the x-ray unit, more particularly the x-ray source, on a model-like sphere. The model values may form a basis for the ascertainment of the pose of the x-ray source relative to the object.

In some embodiments, there is a device for machine learning, e.g. an artificial neural network, to be trained to ascertain the pose of the x-ray unit relative to the object on the basis of the ascertained attenuation of the x-ray beam using the model values. In some embodiments, the device for machine learning is a convolutional neural network. Consequently, the model values can form training data to train the device for machine learning. On the basis of the model values, the device for machine learning can learn or recognize laws, relationships, or connections between the pose of the x-ray unit relative to the object and the attenuation of the x-ray beam.

In some embodiments, the pose of the x-ray unit relative to the object may be ascertained at least in part by comparing the ascertained attenuation of the x-ray beam to the model values. By way of example, the pose of the x-ray unit relative to the object is ascertained by virtue of the pose of the x-ray unit relative to the object, whose model values for the attenuation have the smallest deviation from the ascertained attenuation, being ascertained from the poses for which model values were calculated. Expressed differently, from the poses for which the model values were calculated, it is possible to select that pose whose model values for the attenuation have the smallest deviation from the ascertained attenuation. In some embodiments, there can be an extrapolation on the basis of the model values and on the basis of the poses for which model values were calculated in order to determine the pose of the x-ray unit relative to the object even more precisely.

In some embodiments, the device for machine learning may be further trained by backpropagation. In some embodiments, the backpropagation is carried out on the basis of the comparison of the model values with the ascertained attenuation of the x-ray beam. In some embodiments, it is possible to use data obtained by extrapolation on the basis of the model values to extend the model values. In this way, it is possible to improve the accuracy when ascertaining the pose of the x-ray unit relative to the object.

In some embodiments, projection values for the attenuation of the x-ray beam may be calculated for the ascertained pose of the x-ray unit relative to the object and for said projection values to be compared to the ascertained attenuation of the x-ray beam. In some embodiments, projection values for the attenuation of the x-ray beam are calculated on the basis of the digital model of the object and on the basis of the ascertained pose. The projection values can be calculated according to the same prescription as the model values. In some embodiments, the projection values are calculated in the form of a projection image, wherein the projection image corresponds in particular to a simulation for an x-ray image. The projection image can be compared to the x-ray image recorded by the x-ray detector. The quality of the ascertainment of the pose of the x-ray unit relative to the object can be deduced depending on the degree of correspondence between the projection image and x-ray image. The quality of the ascertainment of the pose of the x-ray unit relative to the object can be considered to be better with improved correspondence between the projection image and the x-ray image.

In some embodiments, there is a two-stage method, in which, initially, the pose of the x-ray unit is ascertained relative to the object on the basis of the model values for the attenuation of the x-ray beam and the ascertained attenuation of the x-ray beam. Subsequently, the projection values for the attenuation are calculated on the basis of the ascertained pose of the x-ray unit relative to the object and said projection values are compared to the ascertained attenuation of the x-ray beam. Consequently, there is two-stage verification for the pose of the x-ray unit relative to the object.

In some embodiments, the calculation of the projection values and/or ascertainment of the pose of the x-ray unit relative to the object by backpropagation may be further trained on the basis of the comparison of the projection values with the ascertained attenuation. In some embodiments, calculation prescriptions for calculating the projection values and/or calculation prescriptions for ascertaining the pose of the x-ray unit relative to the object are fitted in such a way that a deviation that is as small as possible, or a minimal achievable deviation, is attained between the projection values for the attenuation of the x-ray beam and the ascertained attenuation of the x-ray beam. In some embodiments, errors when ascertaining the pose of the x-ray unit are reduced by the two-stage method.

In some embodiments, there is an x-ray apparatus comprising an x-ray source for emitting an x-ray beam and an x-ray detector for ascertaining an attenuation of the x-ray beam by an object situated in the beam path of the x-ray beam. Moreover, the x-ray apparatus comprises a computing unit configured to ascertain structure data of the object on the basis of the attenuation of the x-ray beam.

In some embodiments, the x-ray apparatus comprises a memory unit, in which a digital model of the object is storable. Moreover, the computing unit may be configured to ascertain a pose of the x-ray unit relative to the object on the basis of the detected attenuation of the x-ray beam and the digital model. In some embodiments, the digital model of the object is stored in the memory unit. In some embodiments, the digital model of the object is stored in the memory unit when tomographic reconstruction of the object 4 is to take place. In some embodiments, the computing unit comprises a device for machine learning, more particularly an artificial neural network.

FIG. 1 shows an x-ray apparatus 9 comprising an x-ray unit 1. The x-ray unit 1 comprises an x-ray source 2 and an x-ray detector 3. The x-ray source 2 emits an x-ray beam 5 in the direction of the x-ray detector 3. In some embodiments, the x-ray source 2 is an x-ray tube with a copper anode. The object 4 is situated in a beam path of the x-ray beam 5. In some embodiments, the object 4 is a test object. In some embodiments, a tomographic image of the object 4 is to be created for testing the latter.

Individual parts of the x-ray unit 1, more particularly the x-ray source 2 and the x-ray detector 3, can be movable on their own. In some embodiments, the position of the x-ray source 2 and/or of the x-ray detector 3 can be freely chosen under the condition that the object 4 is situated in the beam path of the x-ray beam 5. Consequently, the x-ray unit 1 can be arranged freely around the object 4. By way of example, this allows testing of particularly large objects 4, for example a rotor for a wind turbine.

In some embodiments, the x-ray beam 5 is an electromagnetic wave at the predetermined wavelength. In some embodiments, x-ray photons of the x-ray beam 5 have an energy of between 5 keV and several 100 keV. The x-ray beam 5 can include monochromatic or polychromatic x-ray radiation.

The x-ray beam 5 is transmitted through the object 4. Expressed differently, the object 4 is passed by the x-ray beam 5. The x-ray beam 5 is attenuated during transmission through the object 4. The amplitude of the x-ray beam 5 is attenuated or reduced. By way of example, the amplitude of the x-ray beam 5 decreases exponentially during transmission through the object 4.

In some embodiments, the x-ray detector 3 comprises a photodiode, a CCD sensor or a photographic plate. The x-ray beam 5 is detected by the x-ray detector 3. In some embodiments, the x-ray detector 3 ascertains the attenuation of the x-ray beam 5 during the transmission through the object 4. In some embodiments, an x-ray image is recorded by the x-ray detector 3. The x-ray image may represent the attenuation of the x-ray beam in a detection plane of the x-ray detector. In some embodiments, the attenuation of the x-ray beam in the detection plane is represented by grayscales of the x-ray image.

The x-ray apparatus 9 may comprise a computing unit 6 for ascertaining structure data of the object 4. In some embodiments, structure data of the object 4 relate to a layer thickness, an amount of substance or a density passed by the x-ray beam 5. On account of the free mobility of the x-ray source 2 and the x-ray detector 3 in relation to one another, it is initially necessary to ascertain the pose of the x-ray unit 1, more particularly of the x-ray source 2 and/or of the x-ray detector 3, relative to the object 4 in order to facilitate tomographic reconstruction of the object 4. In some embodiments, the pose is the position and orientation of the x-ray unit 1 relative to the object 4. The pose of the x-ray unit 1, more particularly of the x-ray source 2 and/or of the x-ray detector 3, relative to the object 4 is tantamount to the pose of the object 4 relative to the x-ray unit 1, more particularly the x-ray source 2 and/or the x-ray detector 3.

In some embodiments, the computing unit 6 comprises a device 7 for machine learning and a memory unit 8. The computing unit 6 may comprise program memory for storing executable program code. In some embodiments, a digital image x of the object 4 is stored in the memory unit 8. In some embodiments, the object 4 has been produced on the basis of the digital image x. In some embodiments, the correct manufacture is to be tested on the basis of the tomographic reconstruction of the object 4. In some embodiments, the digital image x is a CAD model or a blueprint. The device 7 for machine learning can be embodied as an artificial neural network, more particularly as a "convolutional neural network".

A common optimization of calibration of the x-ray unit 1 and the tomographic reconstruction of the object 4 is a problem defined by few conditions. In industrial applications, the digital image x is often available for the object 4. In some embodiments, the digital image x is used as initial information. The use of the digital image x may be advantageous, particularly if the x-ray unit 1 has not been calibrated.

In some embodiments, model values 11 for the attenuation of the x-ray beam 5 are calculated for different poses of the x-ray unit 1, more particularly of the x-ray source 2, relative to the object 4 on the basis of the digital image x of the object 4. In some embodiments, model images are calculated, the model images being calculated x-ray images. Expressed differently, the model images of the object 4 can be calculated as model values 11 on the basis of the digital image x of the object 4. In some embodiments, a multiplicity of model values 11 are calculated for a multiplicity of model poses of the x-ray unit 1, more particularly of the x-ray source 2, relative to the object 4. In some embodiments, the model poses can be arranged around the object 4 in accordance with a sphere. In some embodiments, the x-ray unit 1 is arranged in such a way according to the model poses that the x-ray detector 3 always lies opposite the x-ray source 2 on the sphere.

The device 7 for machine learning is trained on the basis of the model values 11. In some embodiments, the device 7 for machine learning may comprise an ascertainment unit 10 for ascertaining the pose of the x-ray unit 1, more particularly of the x-ray source 2, relative to the object 4. The ascertainment unit 10 can be realized as program code, which, for example, is stored and/or executed in the computing unit 6 or the device 7 for machine learning. In some embodiments, the ascertainment unit 10 is trained on the basis of the model values 11.

The ascertainment unit 10 can be configured to learn and/or refine model parameters $\omega$ on the basis of the model values 11, which may serve as training data D for machine learning. In some embodiments, the ascertainment unit 10 comprises a "deep learning model" $f(\cdot)$. The deep learning model $f(\cdot)$ is trained or taught on the basis of the model values 11. In some embodiments, the model values 11 comprise a set of training data $D=\{(b_1,p_1), \ldots, (b_n,p_n)\}$. The training data D comprise pairs of model images $b_i$ and the model pose $p_i$ belonging to the model images. The model pose $p_i$ describes the pose of the x-ray unit 1, more particularly of the x-ray source 2, relative to the object 4, for which a respective model image $b_i$ is calculated.

The following applies to the model images: $b_i$=vec$(I_{Xray})\in \mathbb{R}^m$, where vec($\cdot$) describes a vectorization operator and m describes the dimension of the model image. The following applies to the model pose $p_i$: $p_i\in \mathbb{R}^d$, wherein the model pose $p_i$ may be a vector in d-dimensional space. In some embodiments, $\mathbb{R}$ is the set of real numbers.

In some embodiments, the pose p is set by the orientation q and the position t of the x-ray source 2. In some embodiments, the orientation q is described in quaternions $(q_1,q_2,q_3,q_4)$ and the position t is described in Cartesian coordinates $(t_x,t_y,t_z)$. Here, the quaternions $(q_1,q_2,q_3,q_4)$ describe the three degrees of freedom of rotation in respect of the Cartesian coordinate axes (x,y,z).

In some embodiments, the orientation q can be described in Euler angles and/or the position t can be described in spherical coordinates. Overall, there are six degrees of freedom for the pose p (three in respect of translation; three in respect of rotation). Naturally, this analogously also applies to the model pose $p_i$.

$$p=[q,t]=(q_1,q_2,q_3,q_4,t_x,t_y,t_z)$$

The ascertainment unit 10 ascertains the pose $\hat{p}$, more particularly a pose vector, of the x-ray unit 1, more particularly of the x-ray source 2, on the basis of an x-ray image b captured by the x-ray unit 1. Expressed differently, the pose $\hat{p}$ is ascertained by means of the deep learning model $f(\cdot)$ on the basis of the captured x-ray image b and the model parameters $\omega$:

$$\hat{p}=f(b;\omega)$$

The ascertained pose $\hat{p}$ can subsequently be used for the tomographic reconstruction. The tomographic reconstruction can be expressed by the mathematical problem set forth below. In this case, $A(\cdot)$ is the projection operator, x is the digital image x of the object 4 and $R(\cdot)$ is a regularization term:

$$\arg\min_x \|b - A(\hat{p})x\|^2 + R(x)$$

An optimization function $\mathcal{L}_{pose}$ for ascertaining the pose is defined as follows:

$$\mathcal{L}_{pose} = \|t - \hat{t}\|^2 + \beta \left\|q - \frac{\hat{q}}{\|\hat{q}\|}\right\|^2$$

Figure 2:
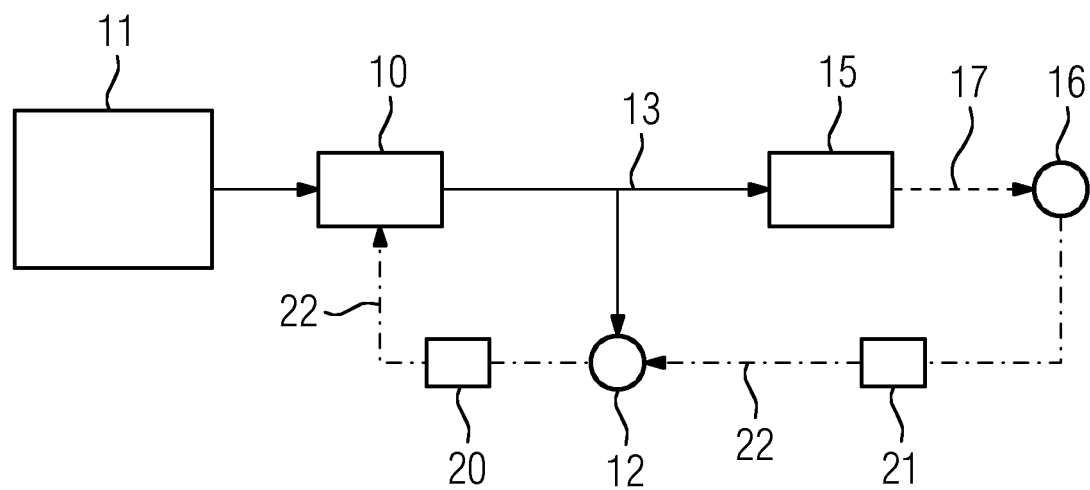
FIG. 2 shows a block diagram of an example embodiment of a method incorporating teachings of the present disclosure.

The optimization function $\mathcal{L}_{pose}$ can be trained by means of the model values 11 that form the training data D. By way of example, the various pairs $(b_i,p_i)$ of model images $b_i$ and model poses $p_i$ are inserted into the optimization function $\mathcal{L}$ in this case. It should be noted in the formula above that the quaternions $\hat{q}$ for the ascertained pose $\hat{p}$ are normalized. The t are the Cartesian coordinates of the ascertained pose $\hat{p}$. $\beta$ is a weighting factor for weighting the Cartesian coordinates and the quaternions. In FIG. 2, the optimization function $\mathcal{L}_{pose}$ is represented by a first point 12. After training the ascertainment unit 10, the same can ascertain the pose of the x-ray unit 1, more particularly of the x-ray source 2.

The model parameters $\omega$ of the deep learning model $f(\cdot)$ can be fitted by a first backpropagation 20. To this end, FIG. 2 provides a backpropagation path 22. In particular, the first backpropagation 20 is implemented by forming a gradient, preferably of the optimization function $\mathcal{L}_{pose}$. In the present case, the model parameters $\omega$ are optimized by the first backpropagation 20 directly on the basis of the optimization function $\mathcal{L}_{pose}$. By way of example, a minimum for the error when ascertaining the pose $\hat{p}$ can be found by forming the gradient. In this way, the accuracy of the ascertainment of the pose $\hat{p}$ can be increased by minimizing the error on the basis of known poses, more particularly the model poses $p_i$:

$$\frac{\partial \mathcal{L}_{pose}}{\partial \hat{p}} = \left[\frac{\partial \mathcal{L}_{pose}}{\partial \hat{q}}, \frac{\partial \mathcal{L}_{pose}}{\partial \hat{t}}\right] = \left(\frac{\partial}{\partial \hat{q}_1}, \ldots, \frac{\partial}{\partial \hat{t}_x}, \ldots\right)$$

Additionally, a projector 15 may be provided to further improve the accuracy when ascertaining the pose of the x-ray unit 1, more particularly of the x-ray source 2. The more accurately the pose of the x-ray unit 1, more particularly of the x-ray source 2, is ascertained, the more accurately the tomographic reconstruction of the object 4 can be implemented.

The projector 15 can be part of the device 7 for machine learning. The projector 15 can be realized as program code which, for example, is stored and/or executed in the computing unit 6 or in the device 7 for machine learning. By way of the projector 15, it is possible to calculate projection values for the attenuation of the x-ray beam 5 by the object 4 from the ascertained pose p̂ and the digital image x of the object 4. In particular, a projection image b̂ is calculated, the projection image b̂ corresponding to an x-ray image that is calculated for the x-ray unit 1, more particularly the x-ray source 2, in the ascertained pose p̂ on the basis of the digital image x of the object 4.

$$\hat{b} = A(\hat{p})x$$

The optimization function $\mathcal{L}_{pose}$ can be constricted by defining a projection error $\mathcal{L}_{recon}$. In FIG. 2, the projection error $\mathcal{L}_{recon}$ is represented by a second circle 16. By way of example, the optimization function $\mathcal{L}_{pose}$ can be optimized with the minimization of the projection error $\mathcal{L}_{recon}$ as a constraint. In the present case, there is the constraining assumption that the projection error $\mathcal{L}_{recon}$ does not exceed a predetermined limit value $\epsilon$ (s.t. is an abbreviation for "subject to"):

$$\underset{\hat{t},\hat{q}}{\mathrm{argmin}} \|t - \hat{t}\|^2 + \beta \left\| q - \frac{\hat{q}}{\|\hat{q}\|} \right\|^2, \text{ s.t. } \|b - \hat{b}\|^2 \leq \epsilon$$

Expressed differently, the projection image b̂ for the ascertained pose p̂ and the actual image b may deviate from one another by no more than the predetermined limit value $\epsilon$. Depending on operating mode or learning mode, the actual image b can The optimization function $\mathcal{L}_{pose}$ with the constraint relating to the projection error $\mathcal{L}_{recon}$ can be converted into an optimization problem without constraint by means of a Lagrange multiplier $\lambda$:

$$\underset{\hat{t},\hat{q}}{\mathrm{argmin}} \|t - \hat{t}\|^2 + \beta \left\| q - \frac{\hat{q}}{\|\hat{q}\|} \right\|^2 + \lambda \|b - \hat{b}\|^2$$

where $$\mathcal{L}_{pose} = \|t - \hat{t}\|^2 + \beta \left\| q - \frac{\hat{q}}{\|\hat{q}\|} \right\|^2$$

$$\mathcal{L}_{recon} = \lambda \|b - \hat{b}\|^2$$

The first backpropagation 20 can be replaced or expanded by a second backpropagation 21. In particular, the model parameters $\omega$ are fitted or trained both by means of the first backpropagation 20 and by means of the second backpropagation 21. Consequently, the deep learning model f(•) can be fitted or trained both on the basis of the gradient of the optimization function $\mathcal{L}_{pose}$ and on the basis of a gradient of the projection error $\mathcal{L}_{recon}$. The second backpropagation 21 can be implemented by means of the following gradients:

$$\frac{\partial \mathcal{L}}{\partial \hat{p}} = \frac{\partial \mathcal{L}_{pose}}{\partial \hat{p}} + \lambda \frac{\partial \mathcal{L}_{recon}}{\partial \hat{p}}$$

The following term emerges on account of the chain rule:

$$\frac{\partial \mathcal{L}_{recon}}{\partial \hat{p}} = \frac{\partial \mathcal{L}_{recon}}{\partial \hat{b}} \cdot \frac{\partial A(\hat{p})x}{\partial \hat{p}}$$

On account of the type of the projection operator A(•), it is not possible to analytically determine the gradient of the projection error $\mathcal{L}_{recon}$ in relation to the pose. Therefore, the gradient is numerically approximated individually for each parameter by way of a differential calculation. By way of example, the partial derivative of the Cartesian coordinates $\hat{t}$ along the z-axis can be calculated as follows, where h describes a small, constant number that approaches $\epsilon$:

$$\frac{\partial A(\hat{p})}{\partial \hat{t}_z} = \lim_{h \to \epsilon} \frac{A((\ldots, \hat{t}_z + h)) - A((\ldots, \hat{t}_z - h))}{2h}$$

Lastly, the basics of the teachings of the present disclosure may be summarized: knowledge of the exact pose of the x-ray unit 1, more particularly the x-ray source 2, relative to the object 4 allows the tomographic reconstruction of the object 4. Since the individual parts of the x-ray unit 1, more particularly the x-ray source 2 and the x-ray detector 3, are freely movable and freely positioned in relation to the object 4, determining the pose facilitates the tomographic reconstruction. To this end, model values 11 may be calculated on the basis of a digital image x of the object 4, wherein the model values 11 comprise simulated x-ray images for a plurality of model poses $p_i$ of the x-ray unit 1, more particularly of the x-ray source 2. The model values 11 serve as training data D for training the device 7 for machine learning. After training the device 7 for machine learning, the same is able, in a first path 13, to ascertain the pose of the x-ray unit 1, more particularly of the x-ray source 2, on the basis of an x-ray image of the x-ray unit 1.

For the purposes of verifying the ascertained pose p̂, a projection image b̂ for the ascertained pose p̂ is calculated on the basis of the digital image x in a second path 17. The projection image b̂ is compared to the x-ray image b of the x-ray unit 1.

By way of a backpropagation path 22, the device 7 for machine learning can be adapted or further trained by way of a first backpropagation 20 and/or a second backpropagation 21. In some embodiments, the backpropagation is implemented on the basis of error minimization by forming gradients.

What is claimed is:

1. A method for facilitating tomographic reconstruction, the method comprising:
    emitting an x-ray beam from an x-ray unit;
    ascertaining an attenuation of the x-ray beam caused by transmission through an object situated in a beam path of the x-ray beam;
    ascertaining structure data of the object based at least in part on the attenuation of the x-ray beam; and
    ascertaining a pose of the x-ray unit relative to the object using a digital model of the object and based at least in part on the attenuation of the x-ray beam, wherein the pose of the x-ray unit includes a combination of a relative position and an alignment.

2. The method as claimed in claim 1, wherein the x-ray unit comprises an x-ray source and an x-ray detector.

3. The method as claimed in claim 1, further comprising calculating model values for the attenuation of the x-ray beam during transmission through the object using the digital model of the object for a plurality of poses of the x-ray unit relative to the object.

4. The method as claimed in claim 3, wherein a device for machine learning is trained to ascertain the pose of the x-ray unit relative to the object using the ascertained attenuation of the x-ray beam using the model values.

5. The method as claimed in claim 3, wherein ascertaining the pose of the x-ray unit relative to the object includes comparing the ascertained attenuation of the x-ray beam to the model values.

6. The method as claimed in claim 5, wherein the device is further trained by backpropagation.

7. The method as claimed in claim 1, further comprising calculating projection values for the attenuation of the x-ray beam for the ascertained pose of the x-ray unit relative to the object; and comparing the projection values to the ascertained attenuation of the x-ray beam.

8. The method as claimed in claim 7, wherein the calculation of the projection values and/or ascertainment of the pose of the x-ray unit relative to the object by backpropagation is further trained on the basis of the comparison of the projection values with the ascertained attenuation.

9. An x-ray apparatus comprising:
an x-ray source for emitting an x-ray beam along a beam path;
an x-ray detector for ascertaining an attenuation of the x-ray beam caused by transmission through an object situated in the beam path;
a device for machine learning; and
a memory in communication with the device for machine learning and storing a digital model of the object;
wherein the device for machine learning executes a program containing instructions to ascertain a pose of the x-ray unit relative to the object based at least in part on the detected attenuation of the x-ray beam using the digital model, wherein the pose of the x-ray unit includes a combination of a relative position and an alignment.

10. The x-ray apparatus as claimed in claim 9, wherein the device for machine learning comprises an artificial neural network.

* * * * *